United States Patent
He et al.

(10) Patent No.: US 12,046,427 B2
(45) Date of Patent: Jul. 23, 2024

(54) BACKLIGHT MODULE AND KEYBOARD DEVICE WITH SAME

(71) Applicant: Primax Electronics Ltd., Taipei (TW)

(72) Inventors: Xiang-Ge He, Taipei (TW); Chang-Fu Shen, Taipei (TW); Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 122 days.

(21) Appl. No.: 18/080,410

(22) Filed: Dec. 13, 2022

(65) Prior Publication Data

US 2024/0112869 A1 Apr. 4, 2024

(30) Foreign Application Priority Data

Sep. 30, 2022 (CN) .......................... 202211208606.5

(51) Int. Cl.
| | |
|---|---|
| *H01H 13/83* | (2006.01) |
| *F21V 8/00* | (2006.01) |
| *H01H 13/7065* | (2006.01) |
| *H01H 13/88* | (2006.01) |

(52) U.S. Cl.
CPC ........... *H01H 13/83* (2013.01); *G02B 6/0018* (2013.01); *G02B 6/0031* (2013.01); *G02B 6/0086* (2013.01); *H01H 13/7065* (2013.01); *H01H 13/88* (2013.01)

(58) Field of Classification Search
CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037
See application file for complete search history.

(56) References Cited

U.S. PATENT DOCUMENTS

| | | | |
|---|---|---|---|
| 11,515,107 B2* | 11/2022 | Chen ...................... | G06F 1/1662 |
| 2019/0171297 A1* | 6/2019 | Lin ........................ | G06F 3/0202 |
| 2020/0042101 A1* | 2/2020 | Cheng .................... | H01H 13/83 |
| 2022/0164038 A1* | 5/2022 | Chen ...................... | G06F 3/0238 |

* cited by examiner

*Primary Examiner* — Ahmed M Saeed
(74) *Attorney, Agent, or Firm* — KIRTON McCONKIE; Evan R. Witt (57) ABSTRACT

A keyboard device includes a key module and a backlight module. The key module includes a supporting plate and plural key structures. The key structures are installed on the supporting plate. The backlight module includes a light guide plate, a light-sheltering layer, a reflecting layer, a light-emitting unit, a base plate and an opaque structure. The light guide plate includes a second opening. The second opening includes a lateral wall. The light-sheltering layer is located over the light guide plate. The light-sheltering layer includes a third opening. The reflecting layer is located under the light guide plate. The reflecting layer includes a fourth opening. The light-emitting unit emits a light beam into the light guide plate. The opaque structure is arranged between the light-sheltering layer and the reflecting layer. The opaque structure is located beside the lateral wall of the light guide plate.

22 Claims, 8 Drawing Sheets

BACKLIGHT MODULE AND KEYBOARD DEVICE WITH SAME

FIELD OF THE INVENTION

The present invention relates to a keyboard device, and more particularly to a keyboard device with a light leakage prevention mechanism.

BACKGROUND OF THE INVENTION

Generally, a keyboard device mainly comprises a key module and a backlight module. In order to integrate the keyboard device into another electronic device such as a notebook computer, the backlight module of the keyboard device needs to be provided with a hollow portion for allowing a positioning post of the key module to pass through. However, the light beam in the backlight module easily leaks out from the hollow portion. Therefore, it is important to provide a design for preventing the light beam from leaking out of the hollow portion.

In case that the backlight module is used to provide different luminous effects to different regions or sites of the key module, a light guide plate of the backlight module usually comprises plural slots, and the light guide plate is divided into plural blocks by the slots. Due to the arrangement of the slots, different blocks of the light guide plate cooperate with different light-emitting units to produce different luminous effects. However, the light beam transferred within the light guide plate readily leaks out of the slots to the adjacent blocks.

Therefore, there is a need of providing a mechanism for avoiding light leakage.

SUMMARY OF THE INVENTION

In order to overcome the drawbacks of the conventional technologies, the present invention provides a keyboard device and a backlight module. The keyboard device includes a light leakage prevention mechanism for preventing the light beam from leaking out the openings of the backlight module. A light guide plate of the backlight module includes a slot, and the light guide plate is divided into plural blocks by the slot. The light leakage prevention mechanism can effectively prevent the light beam from leaking out of the slot.

In accordance with an aspect of the present invention, a keyboard device is provided. The keyboard device includes a key module and a backlight module. The key module includes a supporting plate and plural key structures. The supporting plate includes a first top surface, a first bottom surface and plural first openings. The plural first openings are in communication with the first top surface and the first bottom surface. The plural key structures are installed on the supporting plate. Each of the plural key structures includes a keycap. The backlight module is located under the key module. The backlight module includes a light guide plate, a light-sheltering layer, a reflecting layer, a light-emitting unit, a base plate and an opaque structure. The light guide plate includes a second top surface, a second bottom surface and a second opening. The light-sheltering layer is located over the light guide plate. The light-sheltering layer includes a third top surface, a third bottom surface and a third opening. The reflecting layer is located under the light guide plate. The reflecting layer includes a fourth top surface, a fourth bottom surface and a fourth opening. The light-emitting unit emits a light beam into the light guide plate. The second opening is in communication with the second top surface and the second bottom surface. The second opening includes a lateral wall. The third opening runs through the third top surface and the third bottom surface. The third opening is located over the second opening. The fourth opening runs through the fourth top surface and the fourth bottom surface. The fourth opening is located under the second opening. The opaque structure is arranged between the third bottom surface of the light-sheltering layer and the fourth top surface of the reflecting layer. The opaque structure is located beside the lateral wall of the light guide plate. Moreover, a portion of the light beam leaking out of the lateral wall is blocked by the opaque structure.

In an embodiment, the base plate includes a positioning post. The positioning post is downwardly and sequentially penetrated through the third opening, the second opening and the fourth opening.

In an embodiment, the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

In an embodiment, the opaque structure is formed by a printing process, a dispensing process, a transfer printing process or an injection process.

In an embodiment, the opaque structure is made of an opaque material.

In an embodiment, the key module further includes plural elastic elements and a membrane switch. Each of the plural elastic elements further includes a triggering structure. The membrane switch is arranged between the supporting plate and the backlight module. When the keycap of one of the plural key structures is pressed down, the corresponding elastic element is subjected to deformation, and the corresponding triggering structure is penetrated through the corresponding first opening to trigger the underlying membrane switch.

In an embodiment, an overall thickness of the light-sheltering layer, the opaque structure and the reflecting layer is larger than a thickness of the light guide plate.

In accordance with another aspect of the present invention, a backlight module for a keyboard device is provided. The keyboard device includes a key module. The key module includes a supporting plate and plural key structures. The supporting plate includes a first top surface, a first bottom surface and plural first openings. The plural first openings are in communication with the first top surface and the first bottom surface. The plural key structures are installed on the supporting plate. Each of the plural key structures includes a keycap. The backlight module is located under the key module. The backlight module includes a light guide plate, a light-sheltering layer, a reflecting layer, a light-emitting unit and an opaque structure. The light guide plate includes a second top surface, a second bottom surface and a second opening. The second opening is in communication with the second top surface and the second bottom surface. The second opening includes a lateral wall. The light-sheltering layer is located over the light guide plate. The light-sheltering layer includes a third top surface, a third bottom surface and a third opening. The third opening runs through the third top surface and the third bottom surface. The third opening is located over the second opening. The reflecting layer is located under the light guide plate, and including a fourth top surface, a fourth bottom surface and a fourth opening. The fourth opening runs through the fourth top surface and the fourth bottom surface. The fourth opening is located under the second opening. The light-emitting unit emits a light beam into the light guide plate. The opaque structure is arranged between the third bottom surface of the light-sheltering layer and the fourth top surface of the reflecting layer. The opaque structure is located beside the lateral wall of the light guide plate. Moreover, a portion of the light beam leaking out of the lateral wall is blocked by the opaque structure.

In an embodiment, the base plate includes a positioning post. The positioning post is downwardly and sequentially penetrated through the third opening, the second opening and the fourth opening.

In an embodiment, the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

In an embodiment, the opaque structure is formed by a printing process, a dispensing process, a transfer printing process or an injection process.

In an embodiment, the opaque structure is made of an opaque material.

In an embodiment, the key module further includes plural elastic elements and a membrane switch. Each of the plural elastic elements further includes a triggering structure. The membrane switch is arranged between the supporting plate and the backlight module. When the keycap of one of the plural key structures is pressed down, the corresponding elastic element is subjected to deformation, and the corresponding triggering structure is penetrated through the corresponding first opening to trigger the underlying membrane switch.

In an embodiment, an overall thickness of the light-sheltering layer, the opaque structure and the reflecting layer is larger than a thickness of the light guide plate.

In accordance with another aspect of the present invention, a keyboard device is provided. The keyboard device includes a key module and a backlight module. The key module includes a supporting plate and plural key structures. The supporting plate includes a first top surface, a first bottom surface and plural first openings. The plural first openings are in communication with the first top surface and the first bottom surface. The plural key structures are installed on the supporting plate. Each of the plural key structures includes a keycap. The backlight module is located under the key module. The backlight module includes a light guide plate, a light-sheltering layer, a reflecting layer, a light-emitting unit, a base plate and an opaque structure. The light guide plate includes a second top surface, a second bottom surface, a slot, a first block and a second block. The light-sheltering layer is located over the light guide plate. The light-sheltering layer includes a third top surface and a third bottom surface. The reflecting layer is located under the light guide plate. The reflecting layer includes a fourth top surface and a fourth bottom surface. The light-emitting unit emits a light beam into the first block. The slot is in communication with the second top surface and the second bottom surface. The light guide plate is divided into the first block and the second block by the slot. The slot includes a lateral wall. The opaque structure is arranged between the third bottom surface of the light-sheltering layer and the fourth top surface of the reflecting layer. The opaque structure is located beside the lateral wall of the light guide plate. Moreover, a portion of the light beam transferred from the first block to the second block is blocked by the opaque structure.

In an embodiment, the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

In an embodiment, the opaque structure is formed by a printing process, a dispensing process, a transfer printing process or an injection process.

In an embodiment, the opaque structure is made of an opaque material.

In an embodiment, the key module further includes plural elastic elements and a membrane switch. Each of the plural elastic elements further includes a triggering structure. The membrane switch is arranged between the supporting plate and the backlight module. When the keycap of one of the plural key structures is pressed down, the corresponding elastic element is subjected to deformation, and the corresponding triggering structure is penetrated through the corresponding first opening to trigger the underlying membrane switch.

In an embodiment, an overall thickness of the light-sheltering layer, the opaque structure and the reflecting layer is larger than a thickness of the light guide plate.

In accordance with another aspect of the present invention, a backlight module for a keyboard device is provided. The keyboard device includes a key module. The key module includes a supporting plate and plural key structures. The supporting plate includes a first top surface, a first bottom surface and plural first openings. The plural first openings are in communication with the first top surface and the first bottom surface. The plural key structures are installed on the supporting plate. Each of the plural key structures includes a keycap. The backlight module is located under the key module. The backlight module includes a light guide plate, a light-sheltering layer, a reflecting layer, a light-emitting unit and an opaque structure. The light guide plate includes a second top surface, a second bottom surface, a slot, a first block and a second block. The slot is in communication with the second top surface and the second bottom surface. The light guide plate is divided into the first block and the second block by the slot. The slot includes a lateral wall. The light-sheltering layer is located over the light guide plate. The light-sheltering layer includes a third top surface and a third bottom surface. The reflecting layer is located under the light guide plate. The reflecting layer includes a fourth top surface and a fourth bottom surface. The light-emitting unit emits a light beam into the first block. The opaque structure is arranged between the third bottom surface of the light-sheltering layer and the fourth top surface of the reflecting layer. The opaque structure is located beside the lateral wall of the light guide plate. Moreover, a portion of the light beam transferred from the first block to the second block is blocked by the opaque structure.

In an embodiment, the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

In an embodiment, the opaque structure is formed by a printing process, a dispensing process, a transfer printing process or an injection process.

In an embodiment, the opaque structure is made of an opaque material.

In an embodiment, the key module further includes plural elastic elements and a membrane switch. Each of the plural elastic elements further includes a triggering structure. The membrane switch is arranged between the supporting plate and the backlight module. When the keycap of one of the plural key structures is pressed down, the corresponding elastic element is subjected to deformation, and the corresponding triggering structure is penetrated through the corresponding first opening to trigger the underlying membrane switch.

In an embodiment, an overall thickness of the light-sheltering layer, the opaque structure and the reflecting layer is larger than a thickness of the light guide plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
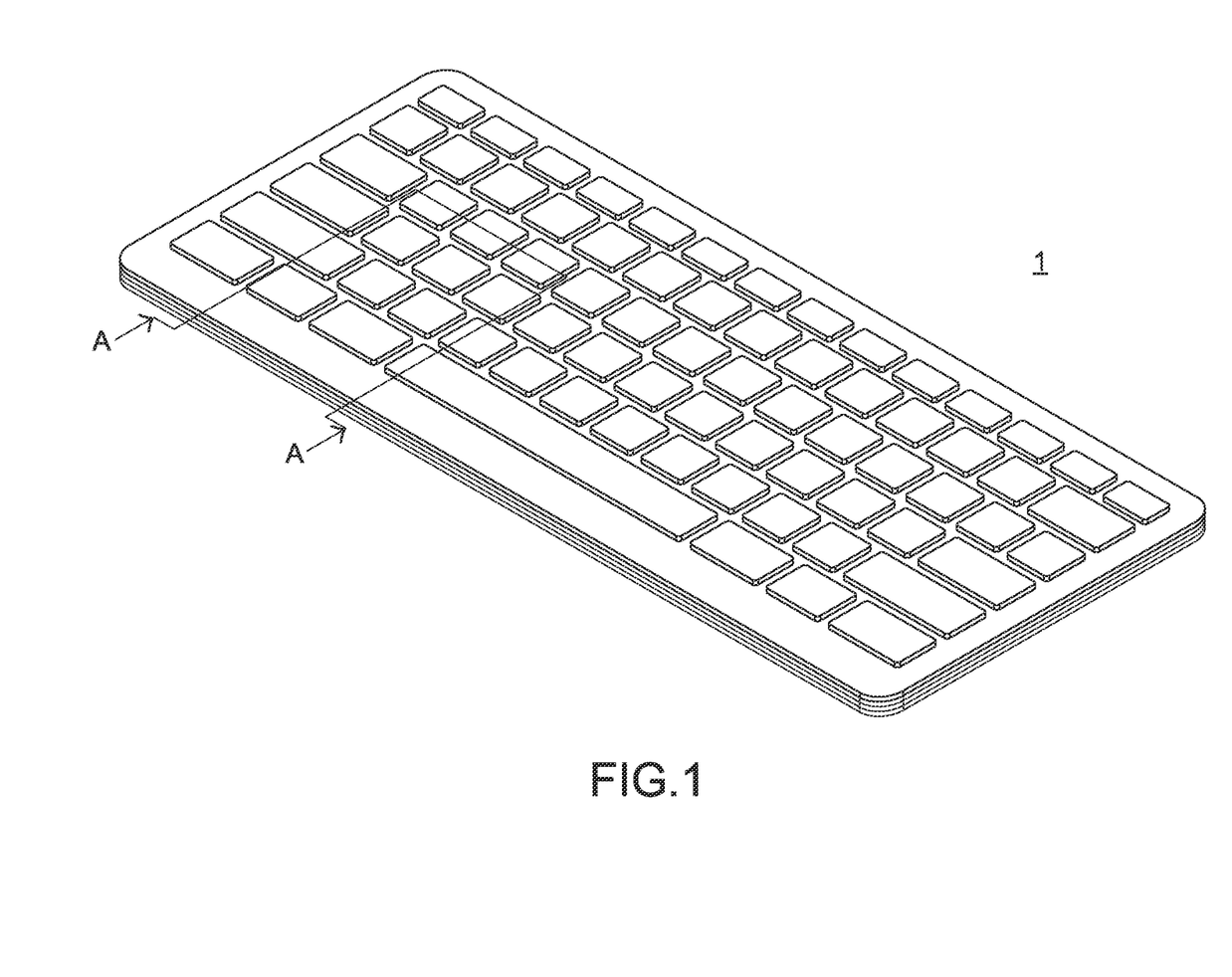
FIG. 1 is a schematic perspective view illustrating a keyboard device according to a first embodiment of the present invention.
Figure 2:
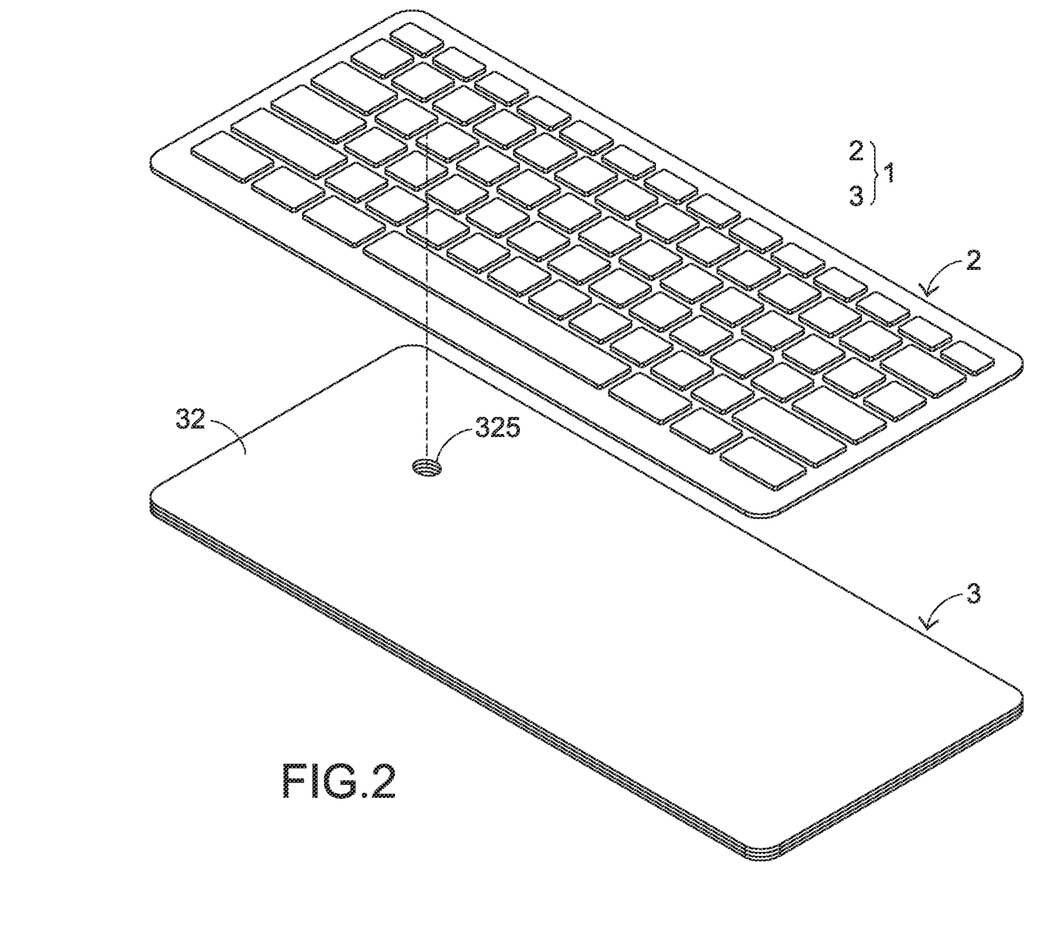
FIG. 2 is a schematic exploded view illustrating the keyboard device as shown in FIG. 1.
Figure 3:
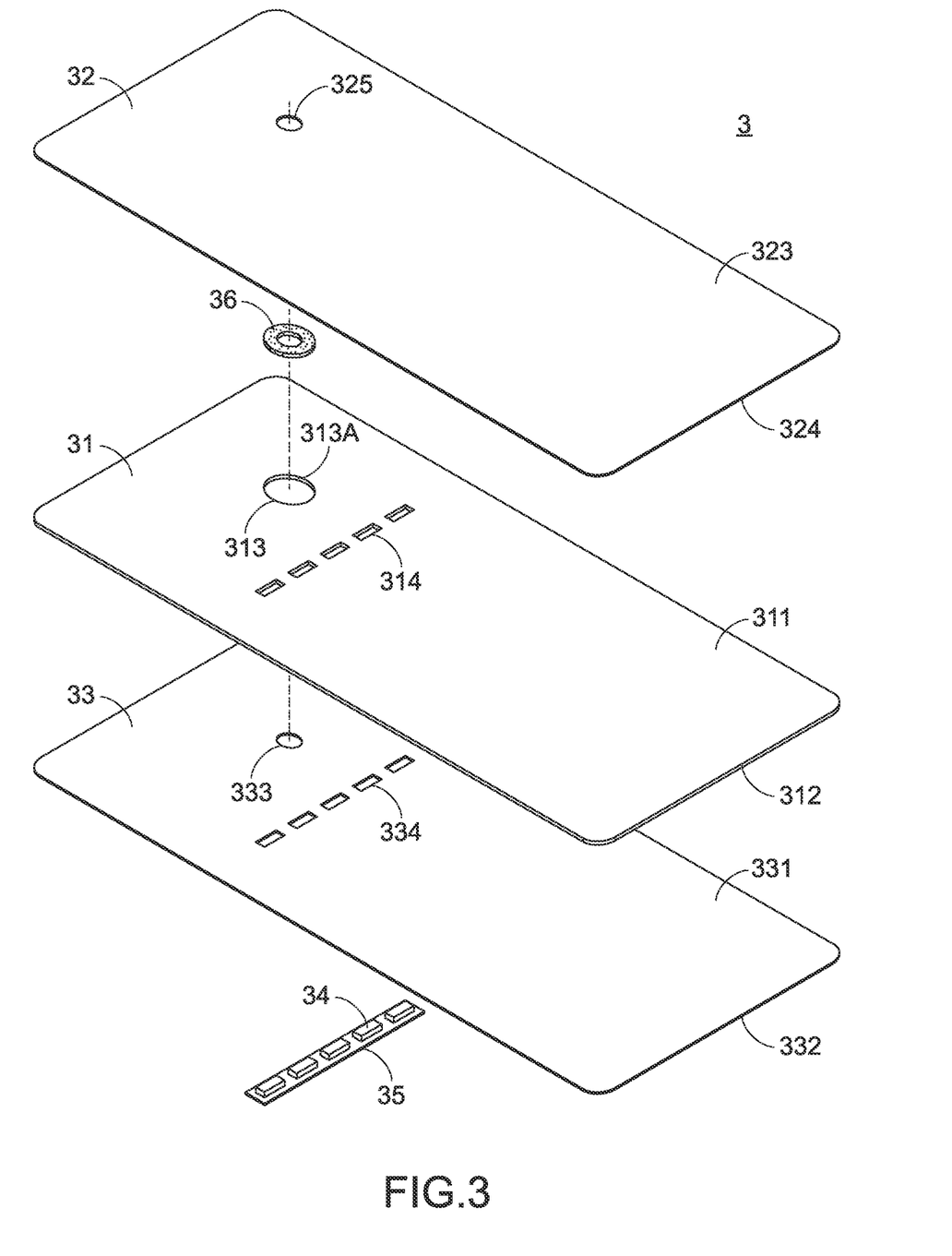
FIG. 3 is a schematic exploded view illustrating a backlight module of the keyboard device as shown in FIG. 2.
Figure 4:
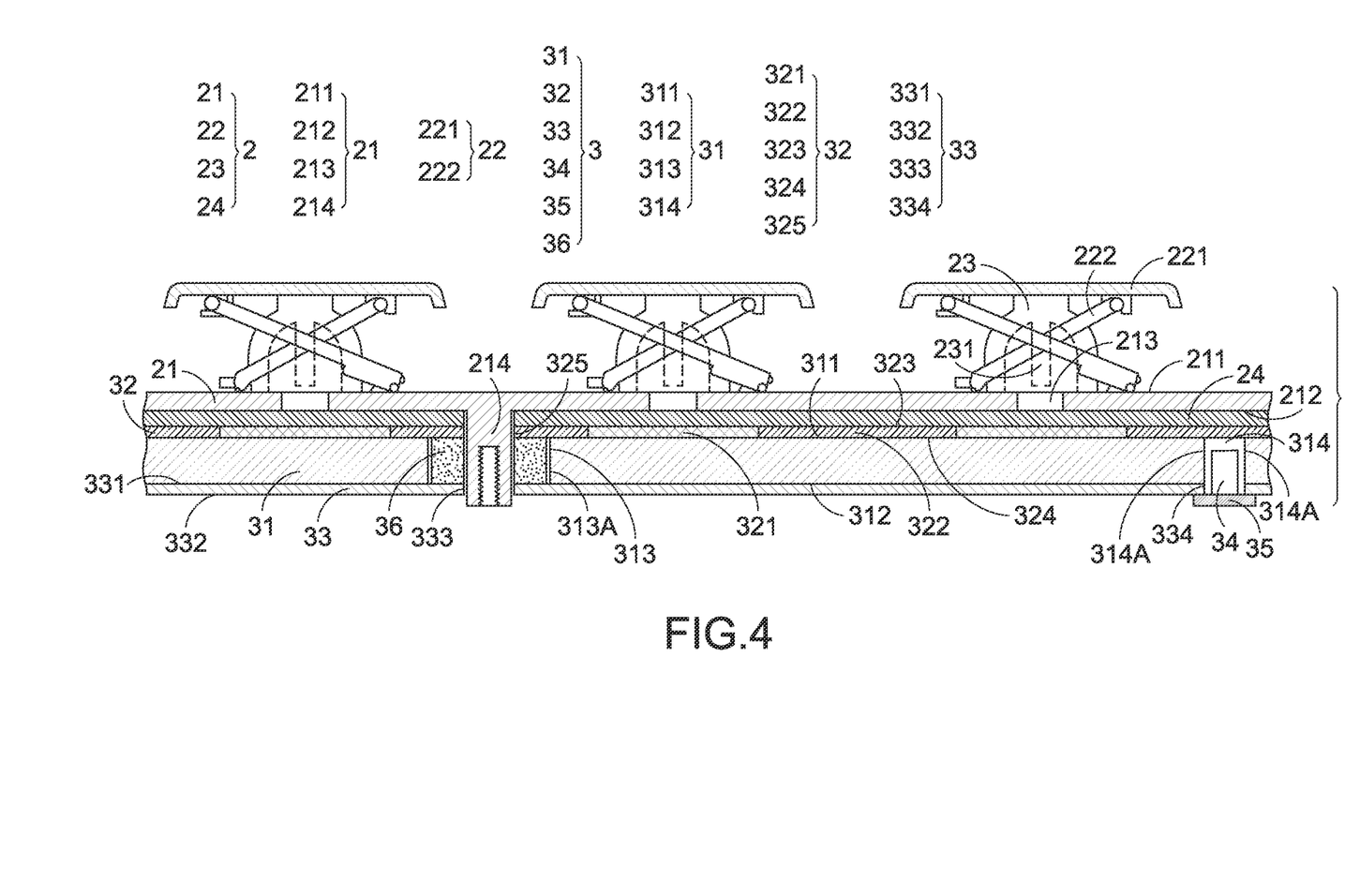
FIG. 4 is a schematic cross-sectional view illustrating a portion of the keyboard device as shown in FIG. 1 and taken along the line A-A.

Please refer to FIGS. 1, 2, 3 and 4. FIG. 1 is a schematic perspective view illustrating a keyboard device according to a first embodiment of the present invention. FIG. 2 is a schematic exploded view illustrating the keyboard device as shown in FIG. 1. FIG. 3 is a schematic exploded view illustrating a backlight module of the keyboard device as shown in FIG. 2. FIG. 4 is a schematic cross-sectional view illustrating a portion of the keyboard device as shown in FIG. 1 and taken along the line A-A. In this embodiment, the keyboard device 1 comprises a key module 2 and a backlight module 3. The keyboard device 1 has a light leakage prevention mechanism for effectively preventing the light beam from leaking out of an opening of the backlight module.

The key module 2 comprises a supporting plate 21, plural key structures 22, plural elastic elements 23 and a membrane switch 24.

The supporting plate 21 comprises a first top surface 211, a first bottom surface 212, plural first openings 213 and a first positioning post 214. The first openings 213 are in communication with the first top surface 211 and the first bottom surface 212. The plural key structures 22 are installed on the supporting plate 21.

Each key structure 22 comprises a keycap 221 and a bracket 222. The bracket 222 is arranged between the keycap 221 and the supporting plate 21. The keycap 221 is movable upwardly or downwardly along a specific trajectory through the bracket 222. Preferably but not exclusively, the bracket 222 is a scissors-type bracket or a butterfly-type bracket.

The elastic element 23 is arranged between the corresponding keycap 221 and the membrane switch 24. The elastic element 23 provides an elastic force. After the keycap 221 is pressed down, the keycap 221 can be returned to its original position in response to the elastic force. The elastic element 23 comprises a triggering structure 231. For example, the triggering structure 231 is a post structure that is protruded downwardly from the elastic element 23.

In this embodiment, the membrane switch 24 is arranged between the supporting plate 21 and the backlight module 3. When the keycap 221 is pressed down, the elastic element 23 is subjected to deformation. In addition, the triggering structure 231 on the elastic element 23 is penetrated through the first opening 213 of the supporting plate 21 to push the underlying membrane switch 24. Consequently, the membrane switch 24 is triggered to generate a pressing signal.

Like the existing membrane switch, the membrane switch 24 used in the keyboard device of the present invention is a membrane switch with three-layer structure. That is, the membrane switch 24 comprises an upper film layer, a spacer layer and a lower film layer. The details of these three layers are not redundantly described herein. In another embodiment, the membrane switch 24 is located over the supporting plate 21, and the membrane switch 24 is located under the keycap 211 and the supporting plate 21. It is noted that the installation position of the membrane switch 24 is not restricted.

The backlight module 3 is located under the key module 2. The backlight module 3 comprises a light guide plate 31, a light-sheltering layer 32, a reflecting layer 33, a light-emitting unit 34, a base plate 35 and an opaque structure 36.

The light guide plate 31 comprises a second top surface 311, a second bottom surface 312, a second opening 313 and a light source receiving recess 314. The second opening 313 is in communication with the second top surface 311 and the second bottom surface 312. The second opening 313 comprises a lateral wall 313A. Moreover, the light source receiving recess 314 comprises a light input surface 314A.

The light-sheltering layer 32 is located over the light guide plate 31. The light-sheltering layer 32 comprises plural light-outputting regions 321 and plural light-sheltering regions 322. The light beam transferred within the light guide plate 31 is controlled or guided by the light-sheltering layer 32. Consequently, the light beam is externally or upwardly outputted from the light-outputting regions 321 to the key module 2, or the light beam is reflected back to the light guide plate 31 by the light-sheltering regions 322 or absorbed by the light-sheltering regions 322. The light-sheltering layer 32 comprises a third top surface 323, a third bottom surface 324 and a third opening 325. The third opening 325 runs through the third top surface 323 and the third bottom surface 324. Moreover, the third opening 325 is located over the second opening 313.

In an embodiment, the light-sheltering layer 32 is a multi-layered structure. For example, the light-sheltering layer 32 is a multi-layered structure with a black light-absorption coating layer, a white reflective coating layer and a transparent supporting layer from top to bottom. In another embodiment, the light-sheltering layer 32 is a multi-layered structure with a black light-absorption coating layer, a transparent supporting layer and a white reflective coating layer from top to bottom. Alternatively, the light-sheltering layer 32 is a multi-layered structure with a transparent supporting layer, a black light-absorption coating layer and a white reflective coating layer from top to bottom. It is noted that the structure of the light-sheltering layer 32 is not restricted.

The reflecting layer 33 is located under the light guide plate 31. The reflecting layer 33 comprises a fourth top surface 331, a fourth bottom surface 332, a fourth opening 333 and a fifth opening 334. Moreover, the fourth opening 333 and the fifth opening 334 run through the fourth top surface 331 and the fourth bottom surface 332. In addition, the fourth opening 333 is located under the second opening 313.

The third opening 325 of the light-sheltering layer 32, the second opening 313 of the light guide plate 31 and the fourth opening 333 of the reflecting layer 33 are aligned with each other along the vertical direction. The area of the second opening 313 of the light guide plate 31 is larger than the area of the third opening 325 of the light-sheltering layer 32 and the area of the fourth opening 333 of the reflecting layer 33.

When the key module 2 and the backlight module 3 of the keyboard device 1 are assembled with each other, the first positioning post 214 of the supporting plate 21 is downwardly and sequentially penetrated through the third opening 325 of the light-sheltering layer 32, the second opening 313 of the light guide plate 31 and the fourth opening 333 of the reflecting layer 33. After the first positioning post 214 is fixed on an external device (not shown), the keyboard device 1 is installed on the external device. For example, after the first positioning post 214 is fixed on a casing, a fixing slot or a fixing frame of a notebook computer, the keyboard device 1 is installed in the notebook computer. The first positioning post 214 can provide the positioning function. In case that the first positioning post 214 is a stud or a hot-melt post, the fixing effect of the first positioning post 214 is enhanced. It is noted that the function of the first positioning post 214 is not restricted.

It is noted that numerous modifications and alterations may be made while retaining the teachings of the invention. For example, in another embodiment, no positioning post is penetrated through the third opening 325 of the light-sheltering layer 32, the second opening 313 of the light guide plate 31 and the fourth opening 333 of the reflecting layer 33. Under this circumstance, the third opening 325 of the light-sheltering layer 32, the second opening 313 of the light guide plate 31 and the fourth opening 333 of the reflecting layer 33 are used as heat exhaust channels for dissipating heat.

The light-emitting unit 34 is supported on the base plate 35. The light-emitting unit 34 emits a light beam into the light guide plate 31. In an embodiment, the light-emitting unit 34 comprises plural light emitting diodes such as side-view light emitting diodes. After the light-emitting unit 34 is penetrated through the fifth opening 334 of the reflecting layer 33, the light-emitting unit 34 is disposed within the light source receiving recess 314 of the light guide plate 31. The light beam emitted by the light-emitting unit 34 is introduced into the light guide plate 31 through the light input surface 314A of the light source receiving recess 314. Moreover, the base plate 35 is a circuit board such as a flexible printed circuit board.

In accordance with a feature of present invention, a light leakage prevention mechanism for preventing the light beam from leaking out of the opening of the backlight module is provided. Especially, the light leakage prevention mechanism is used to prevent the light beam from leaking out of the second opening 313 of the light guide plate 31. For achieving the above purpose, the backlight module 3 is equipped with the opaque structure 36. The opaque structure 36 is arranged between the third bottom surface 324 of the light-sheltering layer 32 and the fourth top surface 331 of the reflecting layer 33. The opaque structure 36 is located beside the lateral wall 313A of the second opening 313 of the light guide plate 31. Especially, the portion of the light beam that leaks out of the lateral wall 313A of the second opening 313 is blocked by the opaque structure 36.

In an embodiment, the opaque structure 36 is formed on the third bottom surface 324 of the light-sheltering layer 32 and extended in the direction toward the fourth top surface 331 of the reflecting layer 33. It is noted that numerous modifications and alterations may be made while retaining the teachings of the invention. For example, in another embodiment, the opaque structure 36 is formed on the fourth top surface 331 of the reflecting layer 33 and extended in the direction toward the third bottom surface 324 of the light-sheltering layer 32. Moreover, the opaque structure 36 is formed by a printing process, a dispensing process, a transfer printing process or an injection process. For example, the printing process is a UV printing process. Moreover, the opaque structure 36 is made of an opaque material such as a black ink material.

As mentioned above, the opaque structure 36 is arranged between the third bottom surface 324 of the light-sheltering layer 32 and the fourth top surface 331 of the reflecting layer 33. The level difference or distance between the light-sheltering layer 32 and the reflecting layer 33 can be compensated by the opaque structure 36. Consequently, for fixing the light-sheltering layer 32 and the reflecting layer 33 on the light guide plate 31, it is not necessary to bend the portions of the light-sheltering layer 32 and the reflecting layer 33 near the second opening 313 of the light guide plate 31 to a large extent. In this way, it is not necessary to retain a large space for forming the second opening 313 of the light guide plate 31. Since the second opening 313 of the light guide plate 31 is reduced, the light guide area of the light-guiding plate 31 is increased. In other words, the capability of the light guide plate 31 to guide the light beam is enhanced.

Since the light leakage prevention mechanism of the present invention is specially designed, the light beam will not leak out of the openings of the backlight module 3, including the third opening 325 of the light-sheltering layer 32, the second opening 313 of the light guide plate 31 and the fourth opening 333 of the reflecting layer 33. In an embodiment, the overall thickness of the light-sheltering layer 32, the opaque structure 36 and the reflecting layer 33 is larger than the thickness of the light guide plate 31. Consequently, the surface flatness of the backlight module 3 can be maintained. In case that it is difficult to achieve the complete flatness of the backlight module 3, the thickness of the opaque structure 36 is at least larger than one third of the thickness of the light guide plate 31.

In the above embodiment, the areas of the third opening 325 of the light-sheltering layer 32, the second opening 313 of the light guide plate 31 and the fourth opening 333 of the reflecting layer 33 are sufficient for the positioning post to pass through. In another embodiment, the areas of the third opening 325 of the light-sheltering layer 32, the second opening 313 of the light guide plate 31 and the fourth opening 333 of the reflecting layer 33 are expanded to cover the region of at least one key structure. For example, in an embodiment, four specific key structures (e.g., the W key, the A key, the S key and the D key) of the keyboard device need to provide special luminous effects. Moreover, four top-view light emitting diodes are respectively installed within the four specific key structures (e.g., the W key, the A key, the S key and the D key). Under this circumstance, a huge opening is formed in the light guide plate and at the positions corresponding to these four key structures. In other words, the huge opening has an inverted-T shape. Similarly, an opaque structure is arranged between the light-sheltering layer and the reflecting layer to seal the opening of the light guide plate. Due to the opaque structure, the light beam will not leak out of the opening of the light guide plate.

In the above embodiment, the opaque structure 36 is arranged between the third bottom surface 324 of the light-sheltering layer 32 and the fourth top surface 331 of the reflecting layer 33. The portion of the light beam leaking out of the lateral wall 313A of the second opening 313 of the light guide plate 31 is blocked by the opaque structure 36. In other words, due to the arrangement of the opaque structure 36, the light beam will not leak from one block of the light guide plate 31 to another block of the light guide plate 31.

Figure 5:
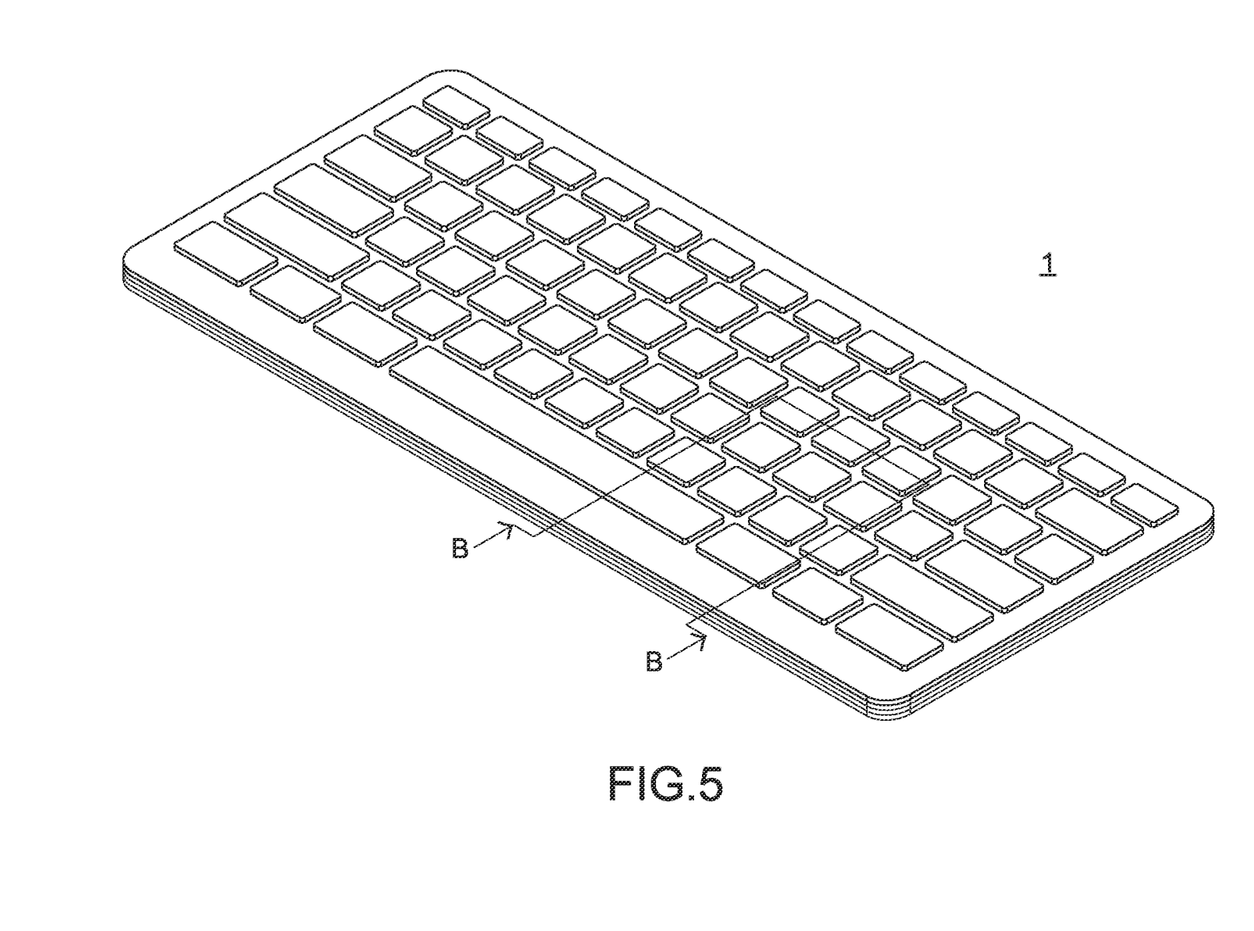
FIG. 5 is a schematic perspective view illustrating a keyboard device according to a second embodiment of the present invention.
Figure 6:
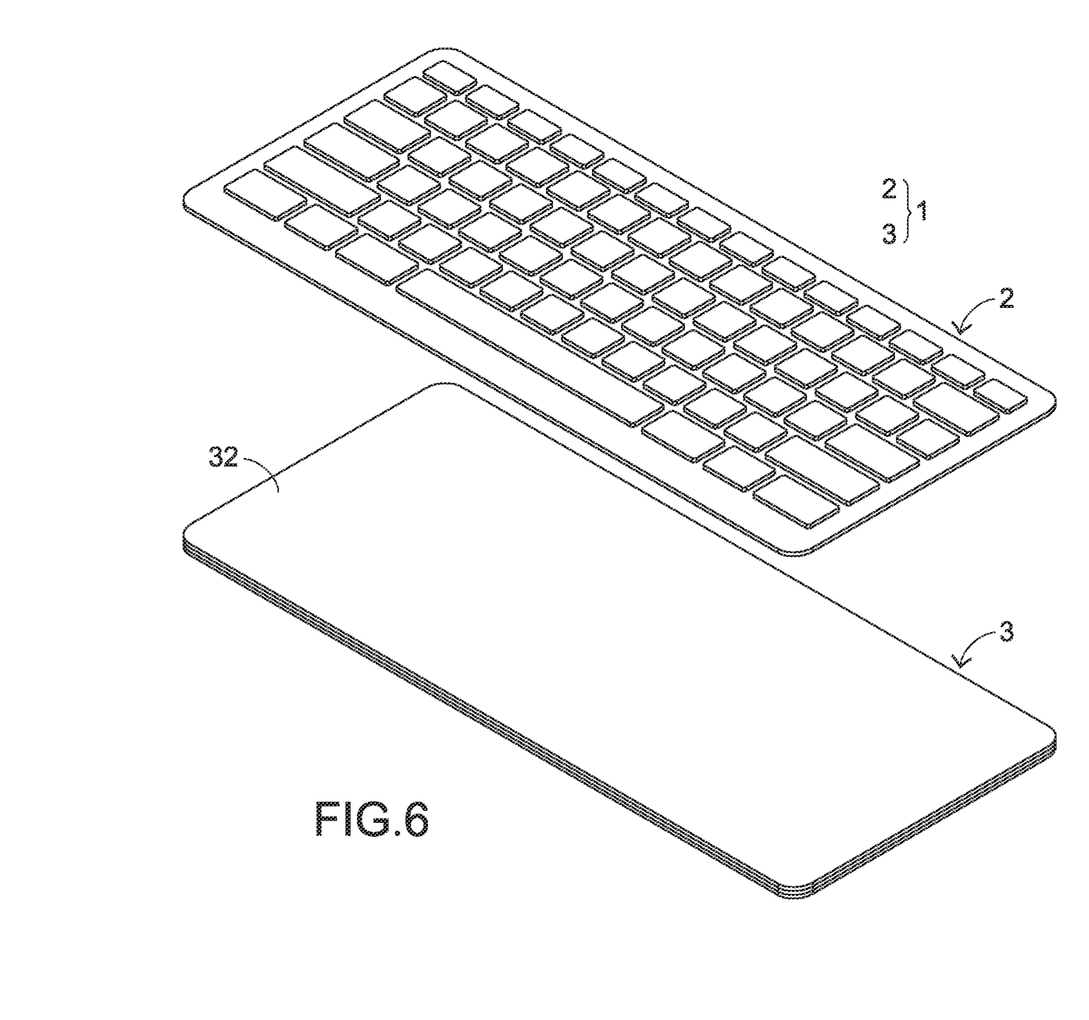
FIG. 6 is a schematic exploded view illustrating the keyboard device as shown in FIG. 5.
Figure 7:
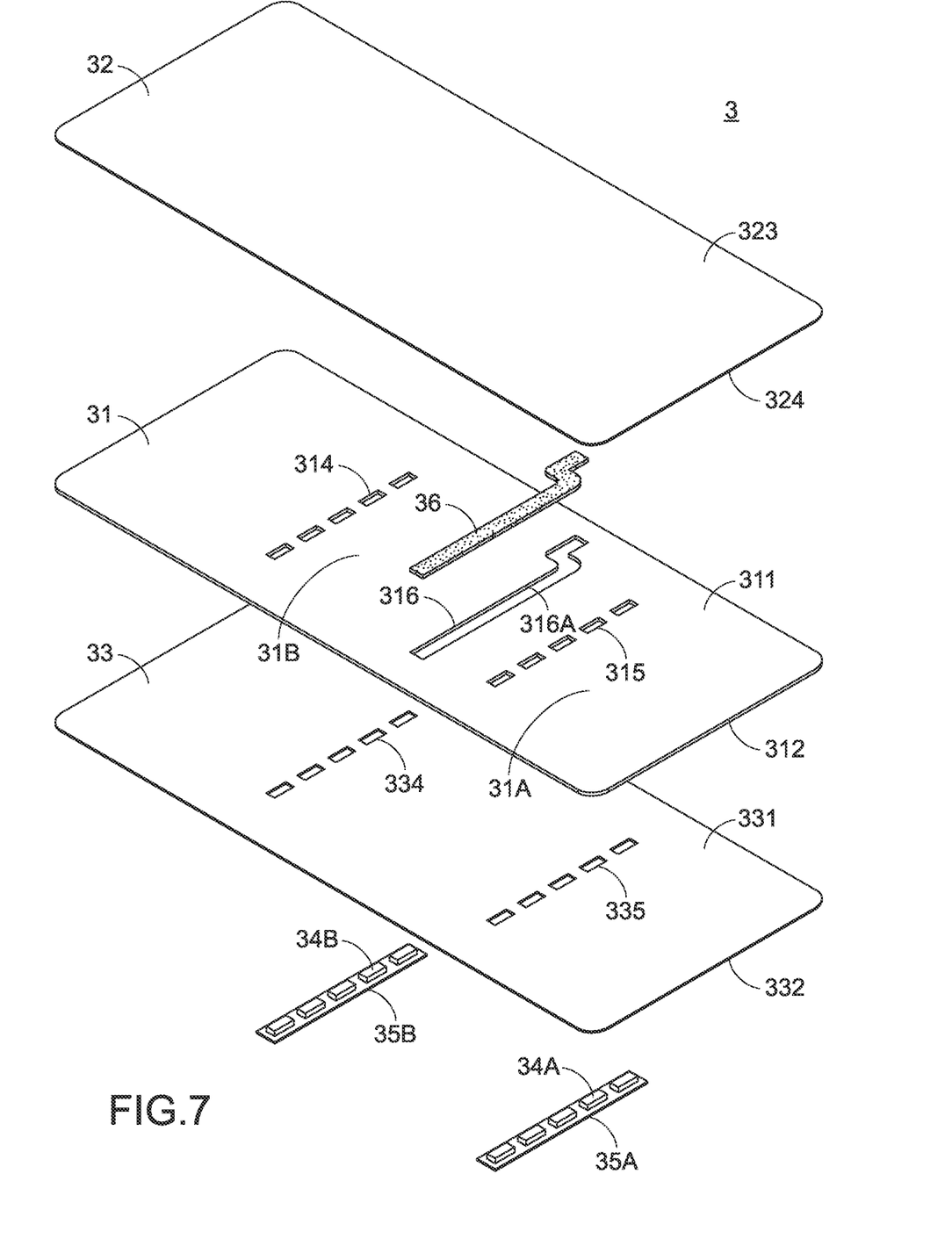
FIG. 7 is a schematic exploded view illustrating a backlight module of the keyboard device as shown in FIG. 6.
Figure 8:
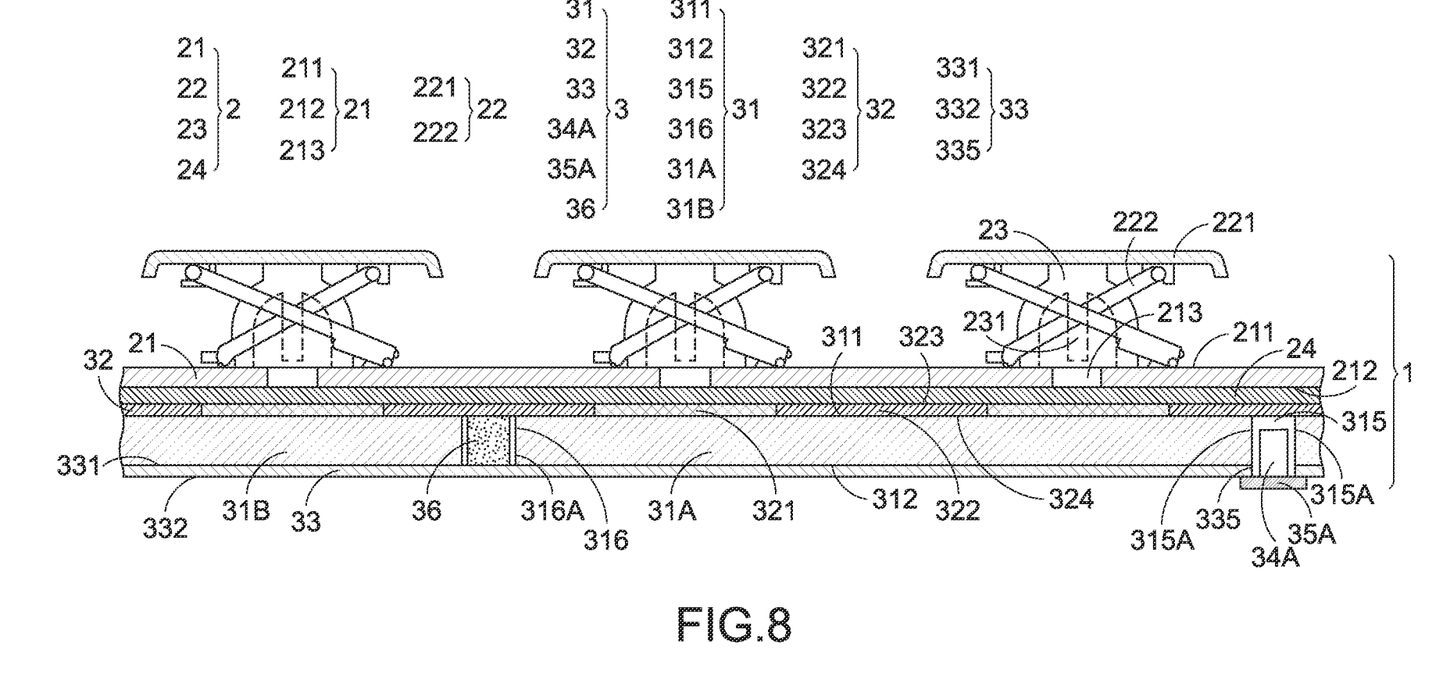
FIG. 8 is a schematic cross-sectional view illustrating a portion of the keyboard device as shown in FIG. 5 and taken along the line B-B.

Please refer to FIGS. 5, 6, 7 and 8. FIG. 5 is a schematic perspective view illustrating a keyboard device according to a second embodiment of the present invention. FIG. 6 is a schematic exploded view illustrating the keyboard device as shown in FIG. 5. FIG. 7 is a schematic exploded view illustrating a backlight module of the keyboard device as shown in FIG. 6. FIG. 8 is a schematic cross-sectional view illustrating a portion of the keyboard device as shown in FIG. 5 and taken along the line B-B. The light guide plate of backlight module has a slot, and plural blocks are divided by the slot. The keyboard device 1 has a light leakage prevention mechanism for effectively preventing the light beam from leaking out of the slot of the backlight module.

In this embodiment, the keyboard device 1 comprises a key module 2 and a backlight module 3. In comparison with the keyboard device 1 of the first embodiment, the structure of the backlight module 3 in the keyboard device 1 of this embodiment is distinguished. The structure of the key module 2 of the second embodiment is similar to the key module 2 of the first embodiment, and not redundantly described herein.

The backlight module 3 is located under the key module 2. The backlight module 3 comprises a light guide plate 31, a light-sheltering layer 32, a reflecting layer 33, two light-emitting units 34A and 34B, two base plates 35A and 35B and an opaque structure 36.

The light guide plate 31 comprises a second top surface 311, a second bottom surface 312, two light source receiving recesses 314 and 315, a slot 316, a first block 31A and a second block 31B. The slot 316 is in communication with the second top surface 311 and the second bottom surface 312. The light guide plate 31 is divided into the first block 31A and the second block 31B by the slot 316. The slot 316 comprises a lateral wall 316A. Moreover, the first light source receiving recess 314 comprises a light input surface 314A, and the second light source receiving recess 315 comprises a light input surface 315A.

The light-sheltering layer 32 is located over the light guide plate 31. The light-sheltering layer 32 comprises plural light-outputting regions 321 and plural light-sheltering regions 322. The light beam transferred within the light guide plate 31 is controlled or guided by the light-sheltering layer 32. Consequently, the light beam is externally or upwardly outputted from the light-outputting regions 321 to the key module 2, or the light beam is reflected back to the light guide plate 31 through the light-sheltering regions 322 or absorbed by the light-sheltering regions 322. The light-sheltering layer 32 comprises a third top surface 323 and a third bottom surface 324.

The reflecting layer 33 is located under the light guide plate 31. The reflecting layer 33 comprises a fourth top surface 331, a fourth bottom surface 332, a fifth opening 334 and a sixth opening 335. Moreover, the fifth opening 334 and the sixth opening 335 run through the fourth top surface 331 and the fourth bottom surface 332.

The light-emitting unit 34A is supported on the base plate 35A. The light-emitting unit 34A emits a first light beam into the first block 31A of the light guide plate 31. The light-emitting unit 34B is supported on the base plate 35B. The light-emitting unit 34B emits a second light beam into the second block 31B of the light guide plate 31. Each of the light-emitting units 34A and 34B comprises plural light emitting diodes such as side-view light emitting diodes. After the light-emitting unit 34A is penetrated through the sixth opening 335 of the reflecting layer 33, the light-emitting unit 34A is disposed within the light source receiving recess 315 of the light guide plate 31. The first light beam emitted by the light-emitting unit 34A is introduced into the first block 31A of the light guide plate 31 through the light input surface 315A of the light source receiving recess 315. After the light-emitting unit 34B is penetrated through the fifth opening 334 of the reflecting layer 33, the light-emitting unit 34B is disposed within the light source receiving recess 314 of the light guide plate 31. The second light beam emitted by the light-emitting unit 34B is introduced into the second block 31B of the light guide plate 31 through the light input surface 314A of the light source receiving recess 314. Moreover, each of the base plates 35A and 35B is a circuit board such as a flexible printed circuit board.

In order to provide diverse luminous effects and changes, the backlight module 3 has the design of providing luminous effects in sections. Please refer to FIG. 7 again. In this embodiment, the light guide plate 31 comprises the first block 31A and the second block 31B. The first block 31A corresponds to the light-emitting unit 34A. The second block 31B corresponds to the light-emitting unit 34B. The light guide plate 31 is divided into the first block 31A and the second block 31B by the slot 316. Moreover, the first block 31A and the second block 31B are separated from each other by the slot 316. Consequently, the luminous effect generated by the first block 31A and the luminous effect generated by the second block 31B will not interacted with each other.

Due to the light leakage prevention mechanism of the present invention, the first light beam transferred within the first block 31A of the light guide plate 31 will not leak to the second block 31B of the light guide plate 31, and the second light beam transferred within the second block 31B of the light guide plate 31 will not leak to the first block 31A of the light guide plate 31. For achieving the above purpose, the backlight module 3 is equipped with the opaque structure 36 between the third bottom surface 324 of the light-sheltering layer 32 and the fourth top surface 331 of the reflecting layer 33. The opaque structure 36 is located beside the lateral wall 316A of the slot 316 of the light guide plate 31. Consequently, the first light beam is blocked from being transferred from the first block 31A to the second block 31B, or the second light beam is blocked from being transferred from the second block 31B to the first block 31A.

In an embodiment, the opaque structure 36 is formed on the third bottom surface 324 of the light-sheltering layer 32 and extended in the direction toward the fourth top surface 331 of the reflecting layer 33. It is noted that numerous modifications and alterations may be made while retaining the teachings of the invention. For example, in another embodiment, the opaque structure 36 is formed on the fourth top surface 331 of the reflecting layer 33 and extended in the direction toward the third bottom surface 324 of the light-sheltering layer 32. Moreover, the opaque structure 36 is formed by a printing process, a dispensing process, a transfer printing process or an injection process. For example, the printing process is a UV printing process. Moreover, the opaque structure 36 is made of an opaque material such as a black ink material.

As mentioned above, the opaque structure 36 is arranged between the third bottom surface 324 of the light-sheltering layer 32 and the fourth top surface 331 of the reflecting layer 33. The level difference or distance between the light-sheltering layer 32 and the reflecting layer 33 can be compensated by the opaque structure 36. Consequently, for fixing the light-sheltering layer 32 and the reflecting layer 33 on the light guide plate 31, it is not necessary to bend the portions of the light-sheltering layer 32 and the reflecting layer 33 near the slot 316 of the light guide plate 31 to a large extent. In this way, it is not necessary to retain a large space for forming the slot 316 of the light guide plate 31. Since the slot 316 of the light guide plate 31 is reduced, the light guide area of the light-guiding plate 31 is increased. In other words, the capability of the light guide plate 31 to guide the light beam is enhanced.

In an embodiment, the overall thickness of the light-sheltering layer 32, the opaque structure 36 and the reflecting layer 33 is larger than the thickness of the light guide plate 31. Consequently, the surface flatness of the backlight module 3 can be maintained. In case that it is difficult to achieve the complete flatness of the backlight module 3, the thickness of the opaque structure 36 is at least larger than one third of the thickness of the light guide plate 31.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
a key module comprising a supporting plate and plural key structures, wherein the supporting plate comprises a first top surface, a first bottom surface and plural first openings, and the plural first openings are in communication with the first top surface and the first bottom surface, wherein the plural key structures are installed on the supporting plate, and each of the plural key structures comprises a keycap; and
a backlight module located under the key module, and comprising a light guide plate, a light-sheltering layer, a reflecting layer, a light-emitting unit, a base plate and an opaque structure, wherein the light guide plate comprises a second top surface, a second bottom surface and a second opening, the light-sheltering layer is located over the light guide plate, the light-sheltering layer comprises a third top surface, a third bottom surface and a third opening, the reflecting layer is located under the light guide plate, the reflecting layer comprises a fourth top surface, a fourth bottom surface and a fourth opening, and the light-emitting unit emits a light beam into the light guide plate, wherein the second opening is in communication with the second top surface and the second bottom surface, the second opening comprises a lateral wall, the third opening runs through the third top surface and the third bottom surface, the third opening is located over the second opening, the fourth opening runs through the fourth top surface and the fourth bottom surface, and the fourth opening is located under the second opening, the opaque structure is arranged between the third bottom surface of the light-sheltering layer and the fourth top surface of the reflecting layer, and the opaque structure is located beside the lateral wall of the light guide plate, wherein a portion of the light beam leaking out of the lateral wall is blocked by structure; wherein the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

2. The keyboard device according to claim 1, wherein the base plate comprises a positioning post, wherein the positioning post is downwardly and sequentially penetrated through the third opening, the second opening and the fourth opening.

3. The keyboard device according to claim 1, wherein the opaque structure is formed by a printing process, a dispensing process, a transfer printing process or an injection process.

4. The keyboard device according to claim 1, wherein the opaque structure is made of an opaque material.

5. The keyboard device according to claim 1, wherein the key module further comprises plural elastic elements and a membrane switch, wherein each of the plural elastic elements further comprises a triggering structure, and the membrane switch is arranged between the supporting plate and the backlight module, wherein when the keycap of one of the plural key structures is pressed down, the corresponding elastic element is subjected to deformation, and the corresponding triggering structure is penetrated through the corresponding first opening to trigger the underlying membrane switch.

6. The keyboard device according to claim 1, wherein an overall thickness of the light-sheltering layer, the opaque structure and the reflecting layer is larger than a thickness of the light guide plate.

7. A backlight module for a keyboard device, the keyboard device comprising a key module, the key module comprising a supporting plate and plural key structures, the supporting plate comprising a first top surface, a first bottom surface and plural first openings, the plural first openings being in communication with the first top surface and the first bottom surface, the plural key structures being installed on the supporting plate, each of the plural key structures comprising a keycap, the backlight module being located under the key module, the backlight module comprising:

a light guide plate comprising a second top surface, a second bottom surface and a second opening, wherein the second opening is in communication with the second top surface and the second bottom surface, and the second opening comprises a lateral wall;

a light-sheltering layer located over the light guide plate, and comprising a third top surface, a third bottom surface and a third opening, wherein the third opening runs through the third top surface and the third bottom surface, and the third opening is located over the second opening;

a reflecting layer located under the light guide plate, and comprising a fourth top surface, a fourth bottom surface and a fourth opening, wherein the fourth opening runs through the fourth top surface and the fourth bottom surface, and the fourth opening is located under the second opening;

a light-emitting unit emitting a light beam into the light guide plate; and an opaque structure arranged between the third bottom surface of the light-sheltering layer and the fourth top surface of the reflecting layer, and located beside the lateral wall of the light guide plate, wherein a portion of the light beam leaking out of the lateral wall is blocked by structure; wherein the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

8. The backlight module according to claim 7, wherein the base plate comprises a positioning post, wherein the positioning post is downwardly and sequentially penetrated through the third opening, the second opening and the fourth opening.

9. The backlight module according to claim 7, wherein the opaque structure is formed by a printing process, a dispensing process, a transfer printing process or an injection process.

10. The backlight module according to claim 7, wherein the opaque structure is made of an opaque material.

11. The backlight module according to claim 7, wherein the key module further comprises plural elastic elements and a membrane switch, wherein each of the plural elastic elements further comprises a triggering structure, and the membrane switch is arranged between the supporting plate and the backlight module, wherein when the keycap of one of the plural key structures is pressed down, the corresponding elastic element is subjected to deformation, and the corresponding triggering structure is penetrated through the corresponding first opening to trigger the underlying membrane switch.

12. The backlight module according to claim 7, wherein an overall thickness of the light-sheltering layer, the opaque structure and the reflecting layer is larger than a thickness of the light guide plate.

13. A keyboard device, comprising:

a key module comprising a supporting plate and plural key structures, wherein the supporting plate comprises a first top surface, a first bottom surface and plural first openings, and the plural first openings are in communication with the first top surface and the first bottom surface, wherein the plural key structures are installed on the supporting plate, and each of the plural key structures comprises a keycap; and a backlight module located under the key module, and comprising a light guide plate, a light-sheltering layer, a reflecting layer, a light-emitting unit, a base plate and an opaque structure, wherein the light guide plate comprises a second top surface, a second bottom surface, a slot, a first block and a second block, the light-sheltering layer is located over the light guide plate, the light-sheltering layer comprises a third top surface and a third bottom surface, the reflecting layer is located under the light guide plate, the reflecting layer comprises a fourth top surface and a fourth bottom surface, and the light-emitting unit emits a light beam into the first block, wherein the slot is in communication with the second top surface and the second bottom surface, the light guide plate is divided into the first block and the second block by the slot, the slot comprises a lateral wall, the opaque structure is arranged between the third bottom surface of the light-sheltering layer and the fourth top surface of the reflecting layer, and the opaque structure is located beside the lateral wall of the light guide plate, wherein a portion of the light beam transferred from the first block to the second block is blocked by structure; wherein the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

14. The keyboard device according to claim 13, wherein the opaque structure is formed by a printing process, a dispensing process, a transfer printing process or an injection process.

15. The keyboard device according to claim 13, wherein the opaque structure is made of an opaque material.

16. The keyboard device according to claim 13, wherein the key module further comprises plural elastic elements and a membrane switch, wherein each of the plural elastic elements further comprises a triggering structure, and the membrane switch is arranged between the supporting plate and the backlight module, wherein when the keycap of one of the plural key structures is pressed down, the corresponding elastic element is subjected to deformation, and the corresponding triggering structure is penetrated through the corresponding first opening to trigger the underlying membrane switch.

17. The keyboard device according to claim 13, wherein an overall thickness of the light-sheltering layer, the opaque structure and the reflecting layer is larger than a thickness of the light guide plate.

18. A backlight module for a keyboard device, the keyboard device comprising a key module, the key module comprising a supporting plate and plural key structures, the supporting plate comprising a first top surface, a first bottom surface and plural first openings, the plural first openings being in communication with the first top surface and the first bottom surface, the plural key structures being installed on the supporting plate, each of the plural key structures comprising a keycap, the backlight module being located under the key module, the backlight module comprising:

a light guide plate comprising a second top surface, a second bottom surface, a slot, a first block and a second block, wherein the slot is in communication with the second top surface and the second bottom surface, the light guide plate is divided into the first block and the second block by the slot, and the slot comprises a lateral wall;
a light-sheltering layer located over the light guide plate, and comprising a third top surface and a third bottom surface;
a reflecting layer located under the light guide plate, and comprising a fourth top surface and a fourth bottom surface;
a light-emitting unit emitting a light beam into the first block; and
an opaque structure arranged between the third bottom surface of the light-sheltering layer and the fourth top surface of the reflecting layer, and located beside the lateral wall of the light guide plate, wherein a portion of the light beam transferred from the first block to the second block is blocked by structure; wherein the opaque structure is formed on the third bottom surface of the light-sheltering layer and extended in a direction toward the fourth top surface of the reflecting layer, or the opaque structure is formed on the fourth top surface of the reflecting layer and extended in a direction toward the third bottom surface of the light-sheltering layer.

19. The backlight module according to claim 18, wherein the opaque structure is formed by a printing process, a dispensing process, a transfer printing process or an injection process.

20. The backlight module according to claim 18, wherein the opaque structure is made of an opaque material.

21. The backlight module according to claim 18, wherein the key module further comprises plural elastic elements and a membrane switch, wherein each of the plural elastic elements further comprises a triggering structure, and the membrane switch is arranged between the supporting plate and the backlight module, wherein when the keycap of one of the plural key structures is pressed down, the corresponding elastic element is subjected to deformation, and the corresponding triggering structure is penetrated through the corresponding first opening to trigger the underlying membrane switch.

22. The backlight module according to claim 18, wherein an overall thickness of the light-sheltering layer, the opaque structure and the reflecting layer is larger than a thickness of the light guide plate.

\* \* \* \* \*